United States Patent
Baric et al.

(10) Patent No.: US 9,797,489 B2
(45) Date of Patent: Oct. 24, 2017

(54) ACTUATOR THRUST ROD AND METHOD OF ASSEMBLY

(71) Applicant: Parker-Hannifin Corporation, Cleveland, OH (US)

(72) Inventors: Thomas J. Baric, Trafford, PA (US); Michael D. Bridges, Monroeville, PA (US); Adis Halimic, Cheswick, PA (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 205 days.

(21) Appl. No.: 14/764,048

(22) PCT Filed: Feb. 5, 2014

(86) PCT No.: PCT/US2014/014854
§ 371 (c)(1),
(2) Date: Jul. 28, 2015

(87) PCT Pub. No.: WO2014/123991
PCT Pub. Date: Aug. 14, 2014

(65) Prior Publication Data
US 2016/0003332 A1    Jan. 7, 2016

Related U.S. Application Data

(60) Provisional application No. 61/760,812, filed on Feb. 5, 2013.

(51) Int. Cl.
*F16H 25/20* (2006.01)
*B23P 19/04* (2006.01)

(52) U.S. Cl.
CPC ............. *F16H 25/20* (2013.01); *B23P 19/04* (2013.01); *F16H 2025/204* (2013.01); *F16H 2025/2075* (2013.01)

(58) Field of Classification Search
CPC ............... F16H 25/20; F16H 2025/204; F16H 2025/2075; B23P 19/04
See application file for complete search history.

(56) References Cited

U.S. PATENT DOCUMENTS 3,404,580 A * 10/1968 Valenti ................ F16H 25/2056
74/89.35
4,836,305 A    6/1989 Curlett
(Continued)

FOREIGN PATENT DOCUMENTS

| DE | 10 2009 007952 | 8/2010 |
|---|---|---|
| DE | 10 2011 100707 | 11/2012 |
| EP | 0 174 117 | 6/1988 |

OTHER PUBLICATIONS

International Search Report and Written Opinion for corresponding Patent Application No. PCT/US2014/014854 dated Apr. 25, 2014.

*Primary Examiner* — David M Fenstermacher
(74) *Attorney, Agent, or Firm* — Renner, Otto, Boisselle & Sklar, LLP.

(57) ABSTRACT

A linear actuator includes an actuator housing (20), a drive screw assembly (26) extending into the actuator housing (20), a tubular thrust rod (22), and an inner sleeve (104) disposed therein and engaging the drive screw assembly (26) for supporting the drive screw assembly (26) against radial movement during axial movement of the thrust rod (22) relative to the actuator housing (20). The drive screw assembly (26) includes a rotatable drive screw (72), a nut (74) coupled to the thrust rod (22) for movement with the nut (74) and in threaded engagement with the screw (72) for driving the nut (74) relative to the screw (72), and a screw bearing (76) coupled to a distal end (90) of the screw (72) for providing engagement between the screw (72) and the (Continued)

inner sleeve (104), where the nut (74) translates rotational movement of the screw (72) into axial movement of the thrust rod (22).

31 Claims, 11 Drawing Sheets

(56) References Cited

U.S. PATENT DOCUMENTS

| | | | | |
|---|---|---|---|---|
| 5,313,852 | A * | 5/1994 | Arena | F16H 25/2018 |
| | | | | 74/89.13 |
| 6,024,422 | A * | 2/2000 | Drennen | B60T 8/00 |
| | | | | 303/115.2 |
| 6,684,990 | B2 | 2/2004 | Takakusaki | |
| 2005/0132830 | A1* | 6/2005 | Gerbier | F16H 25/20 |
| | | | | 74/89.23 |
| 2010/0206103 | A1* | 8/2010 | Duits | F16H 25/20 |
| | | | | 74/89.34 |
| 2010/0313707 | A1* | 12/2010 | Akashi | F16H 63/18 |
| | | | | 74/665 R |
| 2015/0323049 | A1* | 11/2015 | Rousseau | F16H 25/20 |
| | | | | 74/89.37 |
| 2015/0376929 | A1* | 12/2015 | Scheuring | E05F 15/622 |
| | | | | 74/89.38 |
| 2016/0003332 | A1* | 1/2016 | Baric | F16H 25/20 |
| | | | | 74/89.32 |

* cited by examiner

ACTUATOR THRUST ROD AND METHOD OF ASSEMBLY

RELATED APPLICATIONS

This application is a national phase of International Application No. PCT/US2014/014854 filed on Feb. 5, 2014 and published in the English language, which claims the benefit of U.S. Provisional Application No. 61/760,812 filed Feb. 5, 2013, which is hereby incorporated herein by reference.

FIELD OF INVENTION

The present invention relates generally to linear actuators, and more particularly to an electromechanical linear actuator and method of assembling an electromechanical linear actuator.

BACKGROUND

Linear actuators, such as electromechanical linear actuators, have been used to effect movement of manufacturing components in numerous manufacturing operations. Heretofore, a plurality of actuators have been used to raise, lower, or otherwise move manufacturing components, such as work pieces, tools, or tool holders. In many of these actuators, there is a need to provide a machined internal surface finish of a thrust tube. Machining the internal surface can be an expensive and difficult process to get an acceptable surface finish. In particular, it can be an expensive operation to grind the internal surfaces of a tube that is made of steel or other high strength material necessary to provide the requisite strength of the thrust tube.

SUMMARY OF INVENTION

The present invention enables the provision of a smooth interior surface on a linear actuator thrust rod for an internal bushing that stabilizes the free end of a drive screw. In particular, a method is provided for improving the internal surface finish of a tubular thrust rod of a linear actuator and/or reducing the time and/or cost of providing a desired surface finish on an interior of a tubular thrust rod. A tubular thrust rod need not have a finished interior surface. Rather, an inner sleeve with a desired interior finish is inserted into the interior of the thrust rod. The inner sleeve may be an extruded tube that is relatively inexpensive to make and can provide a desired surface finish that is more economical to produce than a machined internal surface of a tubular thrust rod. The inner sleeve can be attached to the thrust rod using various methods including end plates that capture both tubes concentrically. An alternate method may include gluing the inner sleeve into the thrust rod. Several other methods of fixing the sleeve to the thrust rod can produce the same result. The invention has particular application to cylindrical thrust rods, but can be used on thrust rods or tubes of any cross-sectional shape.

Accordingly, the present invention provides a linear actuator that includes an actuator housing, a drive screw assembly extending into the actuator housing, and a tubular thrust rod including an extruded inner sleeve disposed in the outer tube. The drive screw assembly includes a rotatable drive screw in mesh with a translatable nut such that rotation of the drive screw causes the nut to translate along the drive screw. The thrust rod is attached to the nut for movement with the nut, and the drive screw is provided at its distal end with a bearing that slidably engages an interior surface of the inner sleeve for radially supporting the free end of the drive screw during axial movement of the thrust rod relative to the actuator housing.

More particularly, a linear actuator includes an actuator housing, a tubular thrust rod with an interior, a drive screw assembly including a rotatable drive screw disposed within the housing, the screw extending into the interior of the thrust rod, and a translatable nut in threaded engagement with the screw for driving the nut along a longitudinal axis of the actuator housing. The nut is coupled to a proximal end of the thrust rod for movement with the nut, and a screw bearing is coupled to a distal end of the screw for supporting the distal end of the screw within the thrust rod. The linear actuator also includes a rod bearing engaging an outer diameter of the thrust rod for radially supporting the thrust rod during axial movement. The thrust rod includes an inner sleeve disposed within the interior of the thrust rod. The inner sleeve is engaged by the screw bearing for supporting the distal end of the screw against radial movement during axial movement of the thrust rod.

An inner surface of the inner sleeve engaged by the screw bearing may have a first surface roughness, and an inner surface of the thrust rod defining the interior may have a second surface roughness greater than the first surface roughness.

An inner surface of the inner sleeve engaged by the screw bearing may have a first coefficient of friction, and an inner surface of the thrust rod defining the interior may have a second coefficient of friction greater than the first coefficient of friction.

The inner sleeve may be radially inwardly spaced from the thrust rod.

The linear actuator may further include an end cap coupling together the nut, the thrust rod, and the inner sleeve.

The inner sleeve may be coupled to the thrust rod by an adhesive or by welding.

The linear actuator may further include end caps coupled to opposite ends of the inner sleeve and the thrust rod to couple together the inner sleeve and the thrust rod.

The inner sleeve and the thrust rod may be disposed concentrically with respect to one another.

The inner sleeve preferably is extruded to provide during extrusion a desired surface finish.

The inner sleeve may be made of aluminum.

According to another aspect, a linear actuator includes an actuator housing, a tubular thrust rod with an interior, a rod bearing in the housing engaging the thrust rod for supporting the thrust rod against radial movement, and a drive screw assembly including a rotatable drive screw extending into the thrust rod for driving axial movement of the thrust rod relative to the actuator housing. The linear actuator also includes a coupler disposed at a proximal end of the thrust rod, the coupler coupling the thrust rod to the screw for supporting translation of rotational movement of the screw into axial movement of the thrust rod, and an inner sleeve disposed at least partially in the interior of the thrust rod, the inner sleeve supporting the screw against radial movement during axial movement of the thrust rod.

An inner surface of the inner sleeve supporting the screw against radial movement may have a first surface roughness, and an inner surface of the thrust rod defining the interior may have a second surface roughness greater than the first surface roughness.

An inner surface of the inner sleeve supporting the screw against radial movement may have a first coefficient of friction, and an inner surface of the thrust rod defining the interior may have a second coefficient of friction greater than the first coefficient of friction.

The coupler may engage the actuator housing for supporting the thrust rod against rotational movement.

The drive screw assembly may further include a nut in threaded engagement with the screw and coupling the end cap to the screw.

The inner sleeve may be coupled to the thrust rod by an adhesive or by welding.

The inner sleeve may be coupled to the thrust rod by the coupler.

The drive screw assembly may further include a screw bearing rotatably journaled to a distal end of the screw and engaging the inner sleeve.

The inner sleeve and the thrust rod may be disposed concentrically with respect to one another.

The inner sleeve preferably is extruded to provide during extrusion a desired surface finish.

The inner sleeve may be made of aluminum.

According to yet another aspect, a method of manufacturing a linear actuator includes coupling a rotatable drive screw within an actuator housing, inserting a tubular thrust rod having an interior into the actuator housing, wherein the thrust rod is radially outwardly spaced from the screw, threading a translatable nut to the screw for translating the nut along a longitudinal axis of the actuator housing relative to movement of the screw, coupling the nut to the thrust rod for translating rotational movement of the rotatable screw into axial movement of the thrust rod relative to the actuator housing, inserting a thrust rod bearing in the housing for engaging the outer diameter of the thrust rod for radially supporting the thrust rod during axial movement of the thrust rod, rotatably journaling a screw bearing to a distal end of the screw, inserting an inner sleeve within the interior of the thrust rod, and slidably engaging the screw bearing with the inner sleeve for supporting the distal end of the rotatable screw against radial movement during axial movement of the thrust rod.

The method may further include preparing an inner surface of the inner sleeve, preferably during extrusion of the sleeve, for engaging the screw bearing to have a first surface roughness lesser than a second surface roughness of an inner surface of the thrust rod defining the interior.

The method may further include preparing an inner surface of the inner sleeve for engaging the screw bearing to have a first coefficient of friction lesser than a second coefficient of friction of an inner surface of the thrust rod defining the interior.

The method may further include radially inwardly spacing the inner sleeve from the thrust rod.

The method may include coupling an inner sleeve within the interior of the thrust rod using an adhesive or by welding.

Coupling an inner sleeve within the interior of the thrust rod may include coupling an end cap to respective ends of the inner sleeve and the thrust rod.

The method may further include coupling an end cap to a proximal end of the thrust rod and engaging the end cap with the actuator housing for supporting the thrust rod against rotational movement during axial movement of the thrust rod.

The method may further include extruding the inner sleeve to provide during extrusion a desired surface finish.

According to still another aspect, a method of extending a linear actuator includes driving a rotatable drive screw coupled to and disposed within an actuator housing, driving axial movement of a tubular thrust rod having an interior via the screw, the axial movement being relative to the actuator housing, supporting the thrust rod about its outer diameter with a rod bearing disposed within the actuator housing, the rod bearing supporting the thrust rod against radial movement during axial movement of the thrust rod, supporting the screw against radial movement via engagement of a screw bearing coupled to a distal end of the screw with an inner sleeve coupled within the interior of the thrust rod.

Driving axial movement of the thrust rod may include driving a nut threadedly engaged with the screw and coupled to the thrust rod for movement with the nut, the nut being driven relative to the screw.

The method may further include translating rotational movement of the screw into axial movement of the thrust rod via a nut threadedly engaged with the screw and coupled to the thrust rod for movement with the nut.

Supporting the screw against radial movement may include engagement of the screw bearing with an inner surface of the inner sleeve, the inner sleeve having a first surface roughness, the first surface roughness being lesser than a second surface roughness of an inner surface of the thrust rod defining the interior.

Supporting the screw against radial movement may include engagement of the screw bearing with an inner surface of the inner sleeve, the inner sleeve having a first coefficient of friction, the first coefficient of friction being lesser than a second coefficient of friction of an inner surface of the thrust rod defining the interior.

While principles of the invention have particular applicability to linear actuators, alternative applications include those where it is desired to have an object with a desired interior finish or with one outer shape and a different inner shape. In such case, an inner sleeve/tube of one shape can be inserted into an outer tube of another shape. They can then be affixed to each other using various methods, as discussed herein.

The foregoing and other features of the invention are hereinafter described in greater detail with reference to the accompanying drawings.

DETAILED DESCRIPTION

The principles of the present application have particular application to linear actuators, such as electromechanical linear actuators, for effecting movement of manufacturing components, such as manufacturing work pieces, tools, or tool holders, and thus will be described below chiefly in this context. Such a linear actuator may be suitable for raising, lifting, or otherwise moving or supporting a manufacturing component. It will of course be appreciated, and also understood, that principles of this invention may be applicable to other applications where it is desirable to effect movement, such as in construction equipment, gate operation, etc. It will also be appreciated that the principles of this invention may be applicable to other types of extending actuators or cylinders, such as pneumatic or hydraulic actuators or cylinders. Further the principles of the application have alternative applications where it is desired to have an object with one outer shape and a different inner shape, or where it is desired to have an object with a relatively finished inner surface.

Figure 1:
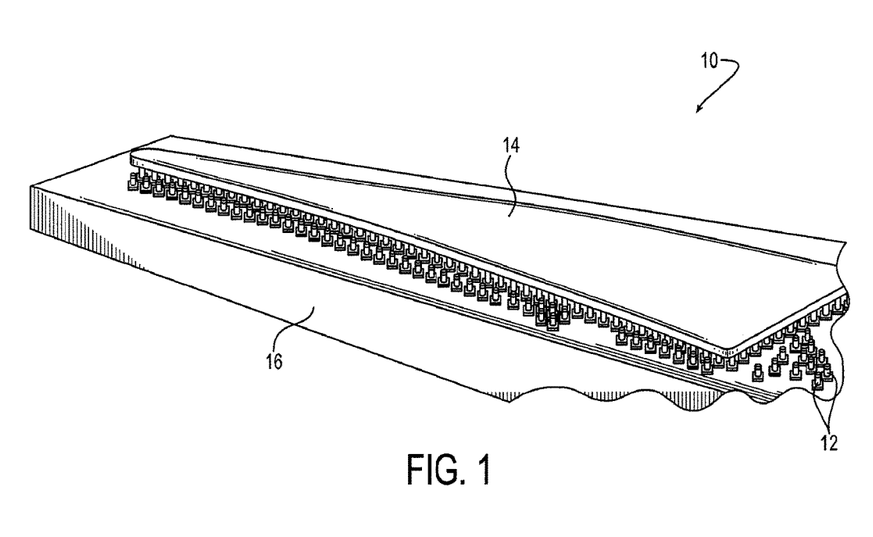
FIG. 1 is a perspective view of a manufacturing assembly including a plurality of exemplary actuators according to the invention.

Referring now in detail to the drawings, and initially to FIG. 1, a manufacturing set up 10 is illustrated and includes a plurality of exemplary linear actuators 12 for raising and/or supporting a work piece 14, such as an aircraft wing. The linear actuators 12, such as electromechanical linear actuators, are secured, such as bolted, to a control surface, such as a work table 16. A portion of the actuators extend vertically therefrom to raise and thereafter maintain a raised height of the work piece 14, supporting the work piece 14 for further manufacturing operations, such as cutting or drilling operations.

One of the exemplary linear actuators 12 is illustrated in FIG. 1. The linear actuator 12 includes an actuator housing 20, a thrust rod 22 for extending and retracting in relation to the actuator housing 20, and a drive screw assembly 26 at least partially disposed within the housing 20. Rotational movement of the drive screw assembly 26 is translated into axial movement of the thrust rod 22 relative to the actuator housing 20. Particularly, the thrust rod 22 is caused to move axially along a longitudinal axis of the actuator housing 20, such as the center longitudinal axis 30 of the actuator housing 20.

The actuator housing 20 has a housing interior 32 and extends axially between a first end 34 and a second end 36. The first and second ends 34 and 36 may include openings for receiving the thrust rod 22 and/or the drive screw assembly 26. Alternatively, a first housing end cap 40 and a second housing end cap 42 may be coupled to the respective first and second ends 34 and 36 of the housing 20 for at least partially closing the first and second ends 34 and 36. The housing end caps 40 and 42 may be coupled to the actuator housing 20 by fasteners, such as bolts 44, or by any other suitable attachment method. As shown, the first housing end cap 40 may open at a first opening 50 for allowing coupling of the drive screw assembly 26 to a device for driving the drive screw assembly 26, such as a motor 52. The motor 52 may be coupled to the first end 34 of the actuator housing 20 for supporting the motor 52 against rotational movement. The second housing end cap 42 may open at a second opening 54 for receiving the thrust rod 22 into the housing interior 32. The actuator housing 20 may be of a length, width, and height to receive a substantial extent of the thrust rod 22 when the thrust rod 22 is retracted into the housing interior 32. As shown, the actuator housing 20 has a quadrilateral outer contour, although the actuator housing 20 may be of any suitable shape or size. Additionally, the actuator housing 20 may be made of aluminum or any other suitable material.

The thrust rod 22 extends axially along a center longitudinal axis 56 of the thrust rod 22, between a proximal end 60 and a distal end 62. During axial movement of the thrust rod 22 relative to the actuator housing 20, the distal end 62 of thrust rod 22 may be supported against radial movement via a bearing 64, such as a radial rod bearing, a slider bearing, or a bushing, disposed at the second end 36 of the actuator housing 20. The bearing 64 (herein also referred to as a rod bearing) may engage an outer diameter 68 of the thrust rod 22, thus supporting the thrust rod 22 about its outer diameter 68. A rod interior 66 is defined by an outer wall 70 of the thrust rod 22. The drive screw assembly 26 extends into the rod interior 66 during extension and retraction of the thrust rod 22 relative to the actuator housing 20. While retracted into the actuator housing 20, a substantial portion of the thrust rod 22 may be disposed in the housing interior 32, while a substantial portion of the drive screw assembly 26 may be disposed in the rod interior 66.

The thrust rod 22 may be cylindrical or of any other suitable shape. Further, the thrust rod 22 may be made of steel or any other suitable material.

The drive screw assembly 26 drives the axial movement of the thrust rod 22 via translation of rotational movement of the drive screw assembly 26 into axial movement of the thrust rod 22. The drive screw assembly 26 is at least partially disposed in the housing interior 32 and may include a rotatable drive screw 72 disposed in the actuator housing 20, a translatable nut 74 in threaded engagement with the rotatable screw 72, and a screw bearing 76, such as a radial bearing, bushing, etc.

The rotatable screw 72 includes screw threads 80 on a screw outer surface 82 and extends axially along a center longitudinal axis 84 of the rotatable screw 72 between a proximal end 86 and a distal end 90. Rotational movement of the rotatable screw 72 may be provided by the motor 52, which may be a rotary motor or any other suitable type of prime mover. Alternatively rotational motion of the rotatable screw 72 may be provided by any other suitable method. The rotatable screw 72 may not be a travelling screw, and during actuation of the motor 52, substantial axial movement of the rotatable screw 72 relative to the actuator housing 20 may not be effected.

As shown, the rotatable screw 72 extends at least partially into the rod interior 66 and may be radially inwardly spaced from the thrust rod 22, which may be radially outwardly spaced from the rotatable screw 72. The proximal end 86 of the rotatable screw 72 may be supported against radial movement by a screw bearing 92, such as a radial screw bearing, or in other embodiments by drive shaft of the motor 52. The screw bearing 92 can be mounted in the first housing end cap 40 or otherwise in the actuator housing 20. The distal end 90 of the rotatable screw 72 may be supported by the bearing 76 disposed at the distal end 90 of the rotatable screw 72. The bearing 76 (herein also referred to as a screw bearing) may be coupled, such as rotatably journaled, to the rotatable screw 72, and the screw bearing 76 may be retained in engagement with the rotatable screw 72 via a retaining device such as a collar, retaining ring 94, or any another suitable method.

The screw threads 80 of the rotatable screw 72 may enable threaded engagement with the nut 74. The nut 74 may include threads 96 (FIG. 6) for engaging the rotatable screw 72. On the other hand, the rotatable screw 72 and nut 74 may be components of a ball screw assembly or of a roller screw assembly. Generally, a coupler, such as the nut 74 or the first rod end cap 100, to be discussed further, may couple the thrust rod 22 to the screw 72, either directly or indirectly, for supporting translation of rotational movement of the screw 72 into axial movement of the thrust rod 22. More particularly, the nut 74 may be coupled to the proximal end 60 of the thrust rod 22 for movement of the thrust rod 22 with the nut 74. The nut 74 and thrust rod 22 may be directly coupled, such as fixedly attached via threaded engagement, welding, adhesives, or other suitable method. Alternatively, the nut 74 may be coupled to a rod end cap, such as a first rod end cap 100, to be discussed further, which may in turn be coupled to the thrust rod 22, as shown best in FIG. 6.

Rotational movement of the rotatable screw 72 causes the translatable nut 74 to be translated along the center longitudinal axis 84 of the rotatable screw 72 relative to the rotational movement of the rotatable screw 72. As illustrated, the center longitudinal axes 84, 30, and 56, respectively of the rotatable screw 72, the actuator housing 20, and the thrust rod 22, may be coincident. Thus rotational movement of the rotatable screw 72 may cause the nut 74 to be driven axially along the center longitudinal axis 30 of the actuator housing 20. Thereby, axial movement of the thrust rod 22 coupled to the nut 74 may be effected, the axial movement of the thrust rod 22 also being along the center longitudinal axis 30 of the actuator housing 20.

The screw bearing 76 at the distal end of the rotatable screw 72, and thus also the rotatable screw 72 and the drive screw assembly 26 generally, may be supported against radial movement via an inner sleeve 104 coupled to the thrust rod 22 and receiving at least part of the rotatable screw 72. The inner sleeve 104 is disposed within the rod interior 66 and is radially inwardly disposed in relation to the thrust rod 22. The inner sleeve 104 may be cylindrical in shape or of any other suitable shape, which may be similar to or different from a shape of the thrust rod 22. The inner sleeve 104 and the thrust rod 22 may be concentrically disposed with respect to one another, or, alternatively, a center longitudinal axis 114 of the inner sleeve 104 may be offset from the center longitudinal axis 56 of the thrust rod 22. As shown, the inner sleeve 104 may be radially inwardly spaced from an inner surface 112 of the thrust rod 22 defining the rod interior 66. In this way, a smaller screw bearing 76 and/or rotatable screw 72 may be utilized, as compared to where the inner sleeve 104 may not be radially inwardly spaced from the thrust rod 22.

The inner sleeve 104 may extend between a proximal end 106 and a distal end 110 with respect to the proximal and distal ends 60 and 62 of the thrust rod 22. An inner surface 112 of the inner sleeve 104 may be engaged, such as slideably engaged, by the screw bearing 76. The inner sleeve 104 and the screw bearing 76 may not remain in continuous engagement during extension and retraction of the thrust rod 22 in relation to the actuator housing 20. Placement of the screw bearing 76 may also cause the rotatable screw 72 to be radially inwardly spaced from the inner sleeve 104, and thus the inner sleeve 104 to be radially outwardly spaced from the rotatable screw 72.

The inner sleeve 104 may be coupled to the thrust rod 22, such as by welding or by adhesives. Alternatively, the inner sleeve 104 and the thrust rod 22 may be coupled to one another via a coupler, such as the nut 74, the first rod end cap 100 or a second rod end cap 120, to be discussed further. Further, any combination of welding, adhesives, the nut 74, the first rod end cap 100, or the second rod end cap 120 may be used to couple the inner sleeve 104 and the thrust rod 22. The inner sleeve 104 may be made of plastic, aluminum, or any other suitable material. Further, the inner sleeve 104 may be an extruded sleeve of material, to provide during extrusion a relatively finished inner surface 112 of the inner sleeve 104.

Via use of the inner sleeve 104, manufacturing steps to make the exemplary linear actuator 12 may be eliminated, thus enabling a more efficient, less expensive, and less timely manufacturing process. Particularly, during axial movement of the thrust rod 22, the screw bearing 76 may slideably engage the inner surface 112 of the inner sleeve 104. The surface engaging the screw bearing 76 must have a low surface roughness and low coefficient of friction to enable the thrust rod 22 to move consistently and rapidly in relation to the actuator housing 20. In a case where the linear actuator 12 does not include an inner sleeve 104, the screw bearing 76 would be slideably engaged with a finished inner surface 122 of a finished thrust rod 22, where the inner surface 122 defines the rod interior 66. In that case, where an unfinished thrust rod 22 is made of steel, or other similar material, the unfinished thrust rod 22 would be subjected to numerous timely and expensive machining processes to form the rod interior 66 defined by a finished inner surface 122. One ordinarily skilled in the art will understand that as a length of the unfinished thrust rod 22 increases, so do the time and expense of the machining processes.

The unfinished thrust rod 22 would be machined first to remove material, forming the rod interior 66 defined by an unfinished inner surface 122. The unfinished surface 122 would also be subsequently machined to finish the inner surface 122 for slideable engagement with the screw bearing 76. The finishing of the inner surface 122 may require an expensive and time consuming secondary machining or manufacturing process. Accordingly, use of the inner sleeve 104 coupled to the thrust rod 22 may eliminate the need for such a secondary machining process. In an exemplary actuator 12 using an inner sleeve 104 inserted into the rod interior 66 of the thrust rod 22, the inner surface 122 of the thrust rod 22 forming the rod interior 66 may be an unfinished inner surface 122. A first surface roughness and/or a first coefficient of friction of the finished inner surface 112 of the inner sleeve 104 may be lesser than a second surface roughness and/or second coefficient of friction, respectively, of the unfinished inner surface 122 of the thrust rod 22 defining the rod interior 66. To put it another way, the second surface roughness and/or second coefficient of friction may be greater than the first surface roughness and/or first coefficient of friction, respectively.

Figure 2:
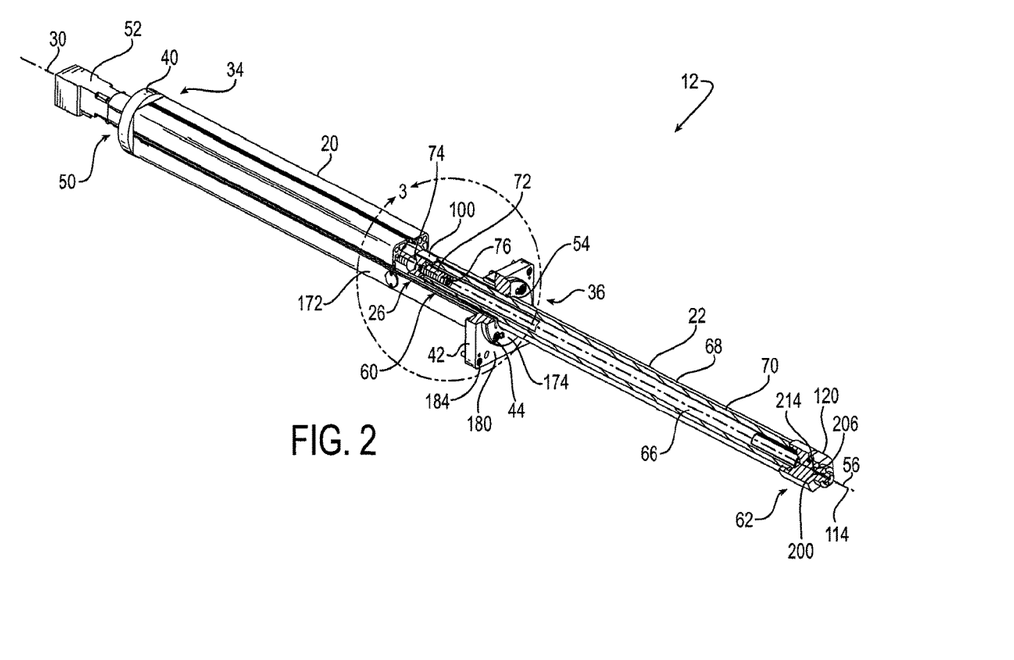
FIG. 2 is a perspective view of one of the exemplary actuators of FIG. 1 with a portion of the body removed.
Figure 3:
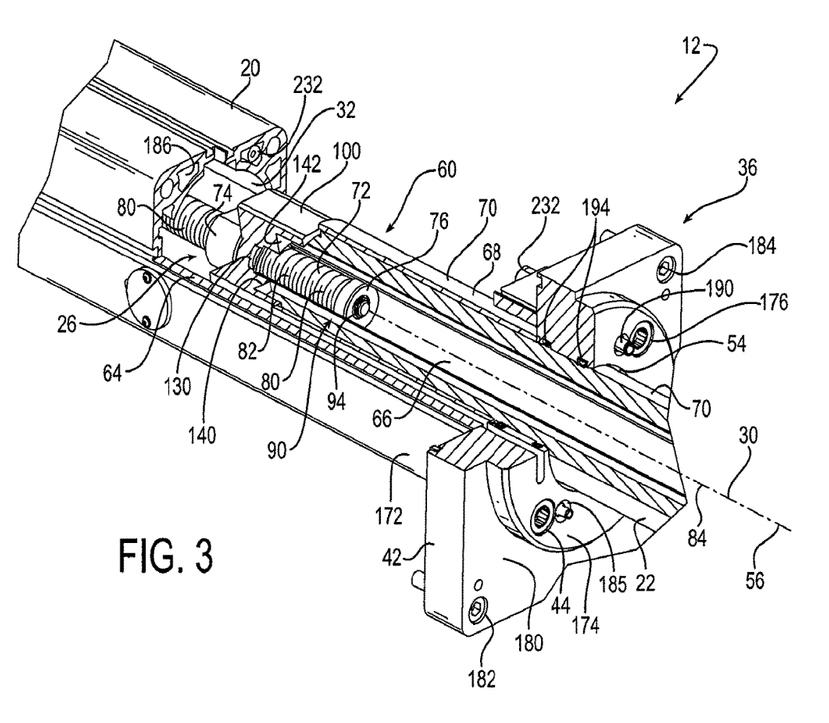
FIG. 3 is another perspective view of the exemplary actuator of FIG. 1.
Figure 4:
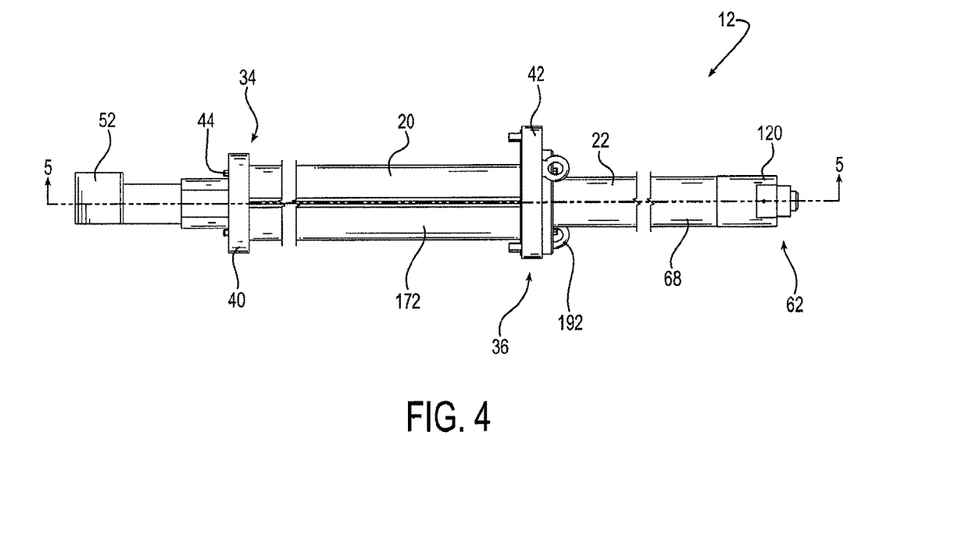
FIG. 4 is a side view of the exemplary actuator of FIG. 1.
Figure 5:
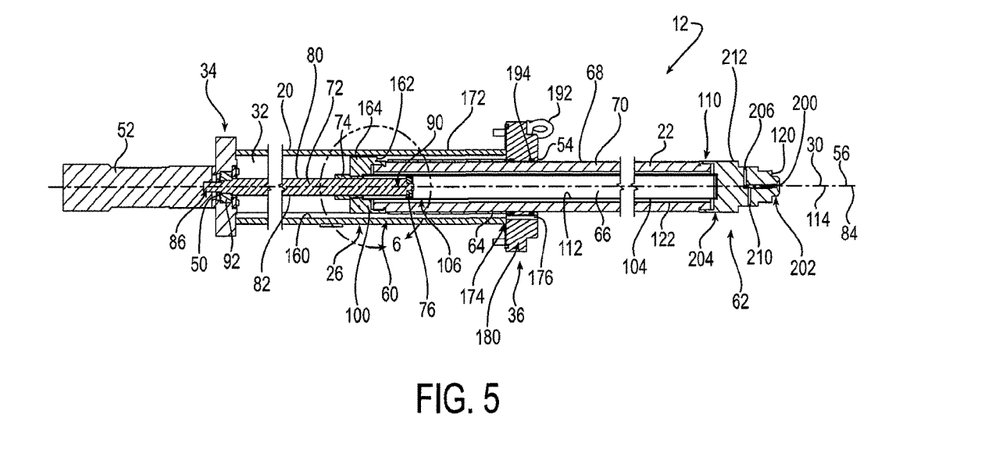
FIG. 5 is a cross-sectional view of the exemplary actuator of FIG. 1.
Figure 6:
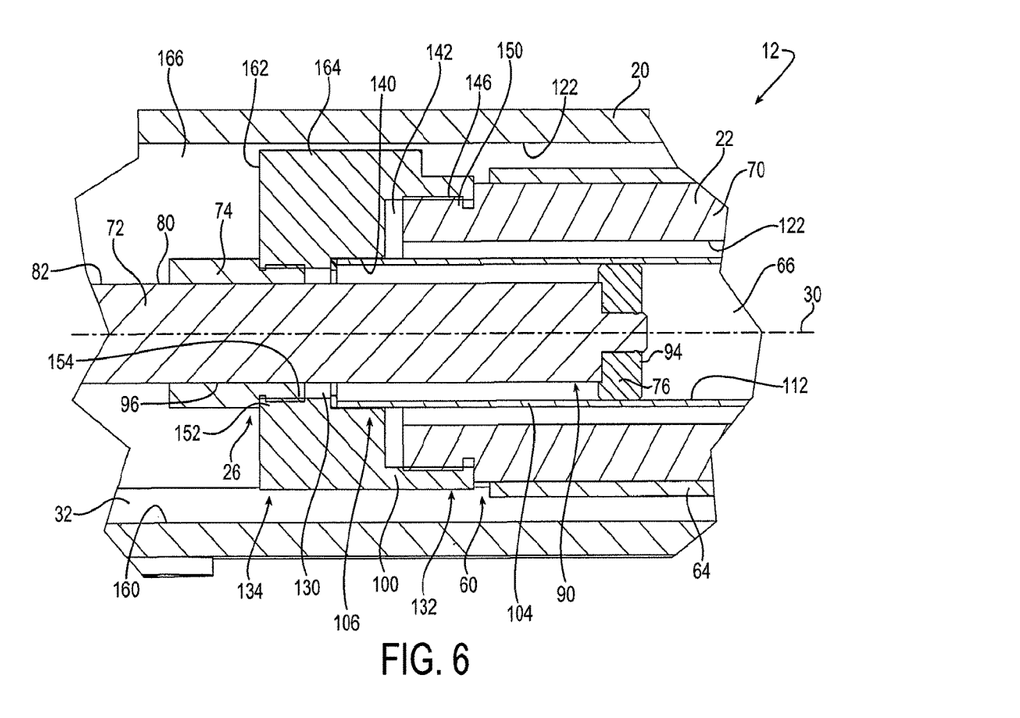
FIG. 6 is another cross-sectional view of the exemplary actuator of FIG. 1.
Figure 7:
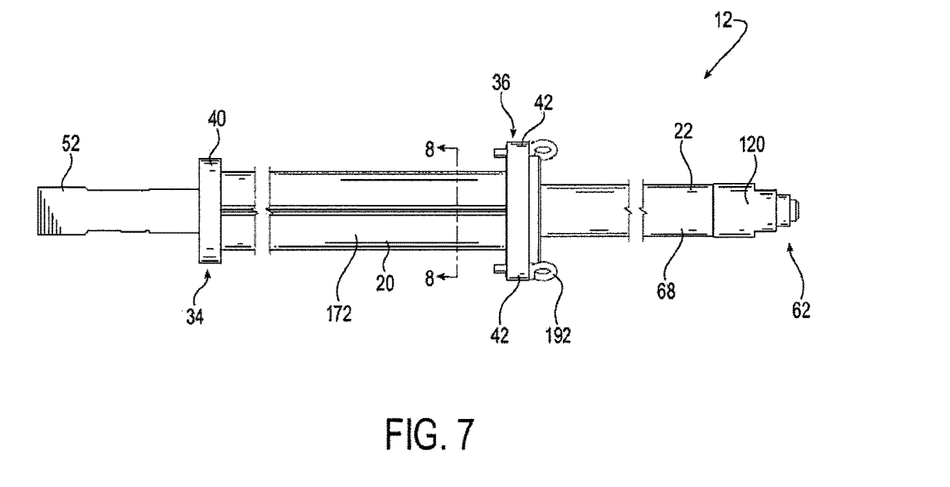
FIG. 7 is a top view of the exemplary actuator of FIG. 1.
Figure 8:
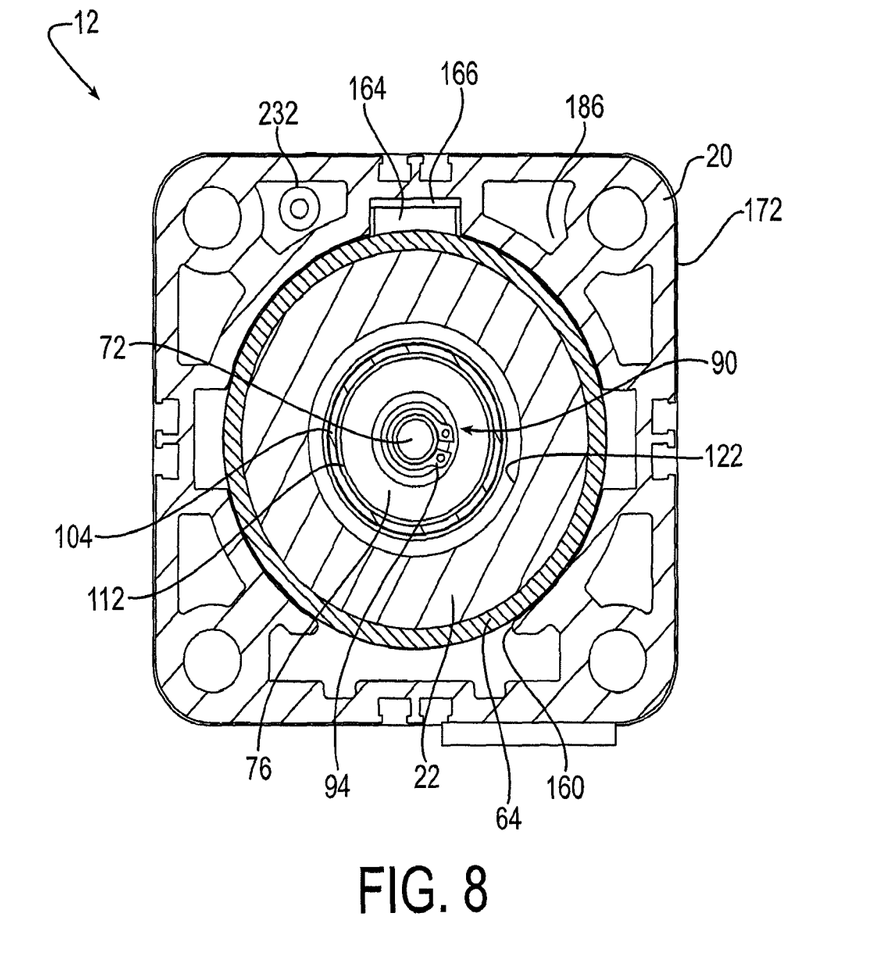
FIG. 8 is still another cross-sectional view of the exemplary actuator of FIG. 1.

As noted, the inner sleeve 104 may be coupled to the thrust rod 22 by a coupler, such as the first rod end cap 100. More particularly, as best shown in FIGS. 2, 3, and 6, the first rod end cap 100 and a second rod end cap 120 may be disposed at respective proximal and distal ends 60 and 62 of the thrust rod 22, each end cap 100 and 120 for coupling the inner sleeve 104 to the thrust rod 22. The first rod end cap 100 may include a central bore 130 extending between a distal side 132 and a proximal side 134 of the first rod end cap 100. The rotatable screw 72 may extend through the central bore 130.

The first rod end cap 100 may also include a first inner recess 140 for receiving the inner sleeve 104 and a second outer recess 142 for receiving the thrust rod 22. Particularly, the proximal end 106 of the inner sleeve 104 may be at least partially received by the first inner recess 140 and the proximal end 62 of the thrust rod 22 may be at least partially received by the second outer recess 142. The first inner recess 140 may extend at least partially through the first rod end cap 100 from the distal side 132 to the proximal side 134, and may have a diameter greater than the central bore 130. The second outer recess 142 may also extend at least partially though the first rod end cap 100 from the distal side 132 to the proximal side 134, and may have a diameter greater than the diameters of the central bore 130 and of the first inner recess 140. The second outer recess 142 and the proximal end 60 of the thrust rod 22 may include threads 146 and 150, respectively, for threadedly engaging the thrust rod 22 and the first rod end cap 100 to one another. Additionally, the central bore 130 may extend through each of the first inner and second outer recesses 140 and 142. In such case, the central bore 130, the first inner recess 140, and the second outer recess 142 may be concentric with respect to one another. One of ordinary skill will also realize that the central bore 130 may be sized to receive the inner sleeve 104, and thus the first rod end cap 100 may not have a first inner recess 140. Also, it will be appreciated that the second rod end cap 120 may include many of the same features as the first rod end cap 100, where the second rod end cap 120 may be configured to receive the distal end 60 of the thrust rod 22 and the distal end 110 of the inner sleeve 104.

As mentioned, the proximal side 134 of the first rod end cap 100 may be coupled to the nut 74 of the drive screw assembly 26. The nut 74 may be coupled to the first rod end cap 100 by threaded engagement of threads 152 on the proximal side 134 of the first rod end cap 100 with threads 154 of the nut 74. Alternatively, the nut 74 may be coupled to the first rod end cap 100 by welding, adhesives, snap-fit, or any other suitable method. Accordingly, the first rod end cap 100 may couple the thrust rod 22 to the rotatable screw 72, via the nut 74, for supporting the translation of the rotational movement of the rotatable screw 72 into the axial movement of the thrust rod 22. One ordinarily skilled in the art will also realize that any of the nut 74, the first rod end cap 100, the second rod end cap 120, or the thrust rod 22 may be integrated into a single component.

Figure 9:
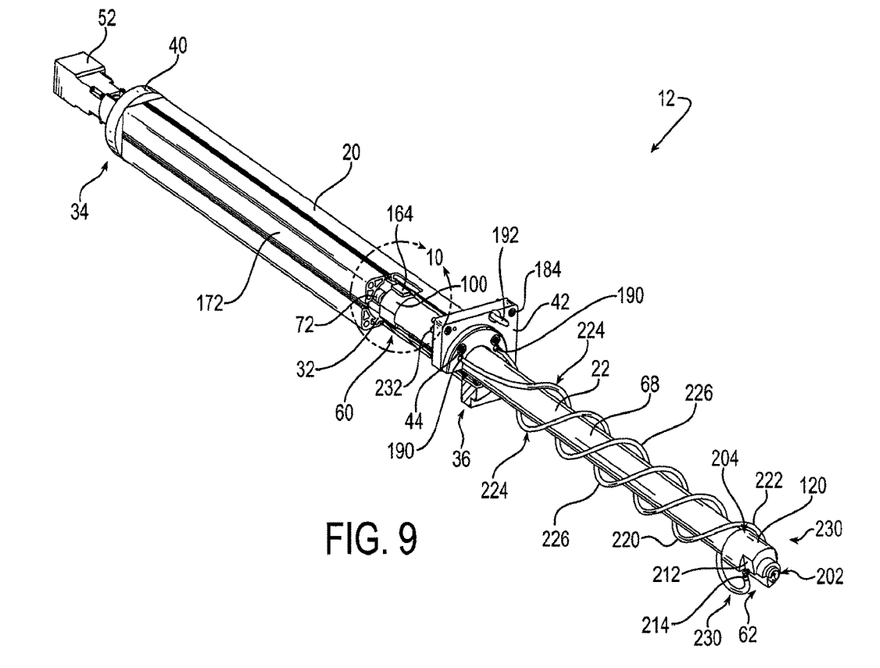
FIG. 9 is another perspective view of the exemplary actuator of FIG. 1 with a portion of the body removed.
Figure 10:
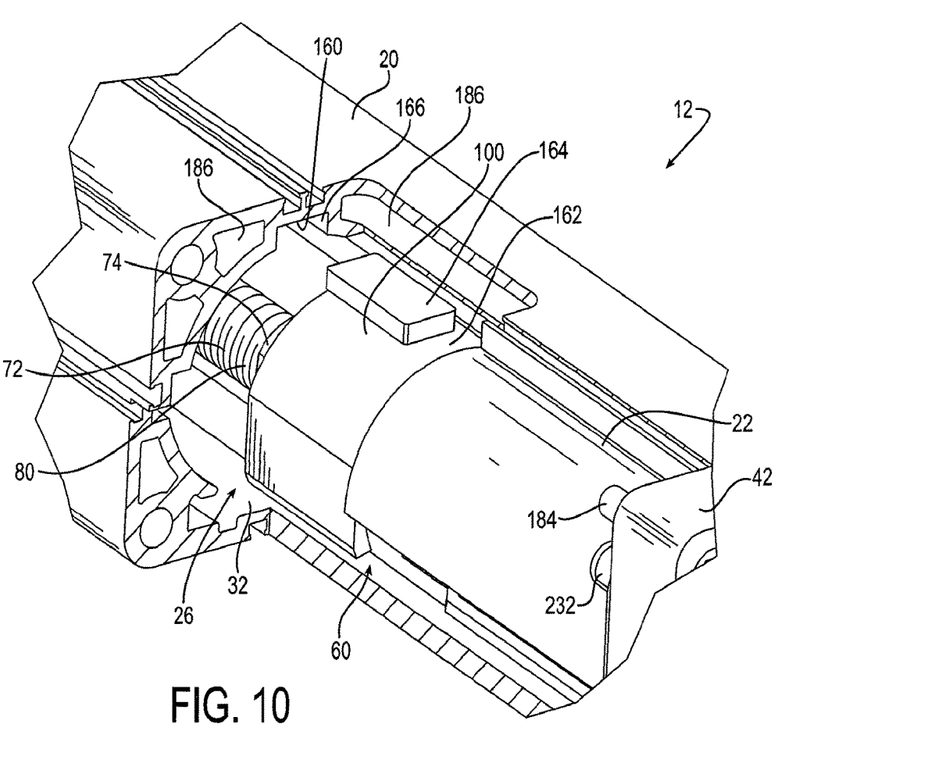
FIG. 10 is still another perspective view of the exemplary actuator of FIG. 1.
Figure 11:
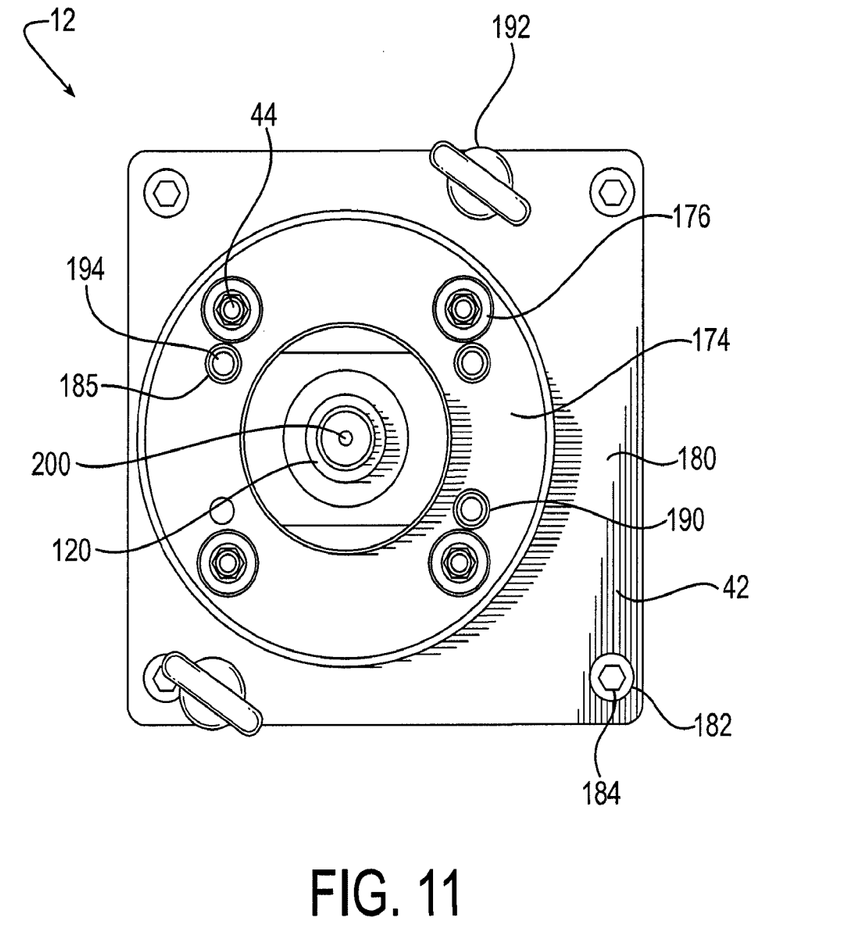
FIG. 11 is a front view of the exemplary actuator of FIG. 1.

Turning now to FIGS. 9 and 10, a coupler, such as the nut 74 or the first rod end cap 100 may also support the thrust rod 22 against rotation, in combination with the actuator housing 20. As shown, an inner surface 160 of the actuator housing 20 defining the housing interior 32 may engage, such as slideably engage, an outer surface 162 of the first rod end cap 100. The engagement may support the first rod end cap 100, and thus the thrust rod 22, against rotational movement during axial movement of the thrust rod 22. The first rod end cap 100 may include one of a protrusion, such as a key 164, or a groove, such as a channel 166, for engaging the other of the key 164 or the channel 166 of the inner surface 160 of the actuator housing 20. The first rod end cap 100 may contain any suitable number of keys or channels spaced about the outer surface 162 of the first rod end cap 100 for cooperating with any suitable number of respective keys or channels spaced about the housing interior 32 of the actuator housing 20. Additionally, or alternatively, any one or more of the first rod end cap 100, thrust rod 22, nut 74, or second rod end cap 120 may instead include one of the key 164 or the channel 166, and any one or more of an inner surface of the actuator housing 20 or the second housing end cap 42 may include the other of the key 164 or the channel 166. Further, the thrust rod 22 may instead be supported externally against rotation and none of the first rod end cap 100, thrust rod 22, nut 74, second rod end cap 120, inner surface 160 of the actuator housing 20, or the second housing end cap 42 may contain the key 164 or the channel 166.

Referring now to the second housing end cap 42, the actuator housing 20 and the second housing end cap 42 may be coupled together via fasteners, such as the bolts 44, or may instead be coupled via welding, adhesives, or any other suitable method. As shown in the figures, the second housing end cap 42 may extend radially outward from an outer contour 172 of the actuator housing 20. An inner portion 174 of the second housing end cap 42 may include bores 176 therethrough for receiving the bolts 44. An outer portion 180 of second housing end cap 42, outwardly spaced from the outer contour 172 of the actuator housing 20, may include additional bores 182 therethrough. Fasteners, such as bolts 184, may be received through the additional bores 182, such as bolt holes, for enabling coupling of the second housing end cap 42, and thus the exemplary linear actuator 12, to a control surface, such as the work table 16 (FIG. 1). Communication bores 185 may also extend through the inner portion 174, and may be in fluid communication, such as liquid communication, gaseous communication, or any combination thereof, with through-passages 186 of the actuator housing 20 extending axially along longitudinal axes of the actuator housing 20 and disposed adjacent the housing interior 32, to be discussed further. Air couplings 190 coupled to the second housing end cap 42 may also be in fluid communication with the communication bores 185, also to be discussed further. Eyebolts 192 may be coupled, such as threadedly engaged, to the second housing end cap 42 for allowing lifting and movement of the exemplary linear actuator 12. Additionally, the second housing end cap 42 may include gaskets, such as o-rings 194, disposed about the second opening 54 for engaging the outer diameter 68 of the thrust rod 22.

Referring now to the second rod end cap 120, in addition to coupling to respective distal ends of the thrust rod 22 and of the inner sleeve 104, the second rod end cap 120 may provide vacuum to the work piece 14 (FIG. 1) to hold the work piece 14 in place for further manufacturing operations. As best shown in FIG. 9, the second rod end cap 120 may include a central passage 200 extending at least partially through the second rod end cap 120 from a distal end 202 to a proximal end 204. The central passage 200 may be in communication with the work piece 14 and with inlet and outlet channels 206 and 210 extending from an outer surface 212 of the second rod end cap 120 to the central passage 200. Air couplings 214 may be coupled to the second rod end cap 120 at the inlet and outlet channels 206 and 210 for allowing connection of air hoses 220 and 222 to the inlet and outlet channels 206 and 210. The air couplings 214 may be coupled to the second rod end cap 120 by threads, welding, adhesives, snap-fit, or any other suitable method.

As shown in FIG. 9, air houses 220 and 222 may be coupled, such as via press-fit, to the air couplings 214 of the second rod end cap 120. Proximal ends 224 of the air hoses may be directly coupled to an external air mover, such as a pumping device (not shown), such as a vacuum pump, pressure pump, etc. Alternatively, the pumping device may be coupled to the actuator housing 20 and the air hoses 220 and 222 may be directly coupled to the air couplings 190 of the second housing end cap 42, as illustrated. The extent 226 of the air hoses 220 and 222, extending between distal ends 230 and the proximal ends 224, may be coiled around the thrust rod 22 for reducing kinking of the air hoses 220 and 222 during extension and retraction of the thrust rod 22. Further, the extent 226 of the air hoses 220 and 222 may run externally to the actuator housing 20, or the actuator housing 20 may include the through-passages 186 for receiving the air hoses 220 and 222 or for connecting the air hoses 220 and 222 to the pumping device. In the latter case, additional air hoses 232 may run internal to the actuator housing 20, through the through-passages 186, or the through-passages 186 may be sealed off from the housing interior 32 and may themselves serve as air passages connected to the pumping device. In use, a pumping device may draw air from the second rod end cap 120 through a first of the air hoses 220 and/or push air, or any other suitable gas, fluid, or combination thereof, to the second rod end cap 120 through a second of the air hoses 222 to draw vacuum on the work piece 14.

In summary, the present application provides an exemplary linear actuator 12 that includes an actuator housing 20, a tubular thrust rod 22 for axially extending and retracting relative to the actuator housing 20, a drive screw assembly 26 at least partially in the actuator housing 20 for driving the axial movement of the thrust rod 22, and an inner sleeve 104 coupled to the thrust rod 22 for supporting the drive screw assembly 26 against radial movement during axial movement of the thrust rod 22. The rotatable drive screw 72 of the drive screw assembly 26 may be caused to rotate via a motor 52 or other method. Rotational movement of the rotatable screw 72 may cause axial translation of the translatable nut 74 relative to the screw 72. The axial movement of the nut 74, coupled to the thrust rod 22 via the first rod end cap 100, may effect axial movement of the thrust rod 22. The thrust rod 22 may be supported against radial movement via the rod bearing 64 and against rotational movement via the first rod end cap 100, which may include at least one of a key 164 or a channel 166. The rotatable screw 72 may be supported against radial movement via the screw bearing 92 at the proximal end 86. Slideable engagement of the radial screw bearing 76 with the inner surface 112 of the inner sleeve 104 may support the screw bearing 76, and thus the distal end 90 of the rotatable screw 72, against radial movement during axial movement of the thrust rod 22. A first surface roughness and/or a first coefficient of friction of the inner surface 112 of the inner sleeve 104 may be lesser than a second surface roughness and/or second coefficient of friction, respectively, of the inner surface 122 of the thrust rod 22 defining the rod interior 66.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A linear actuator, comprising:
an actuator housing;
a tubular thrust rod with an interior;
a drive screw assembly including
a rotatable drive screw disposed within the housing, the screw extending into the interior of the thrust rod,
a translatable nut in threaded engagement with the screw for driving the nut along a longitudinal axis of the actuator housing relative to movement of the screw, wherein the nut is coupled to a proximal end of the thrust rod for movement with the nut, and
a screw bearing coupled to the screw for supporting a distal end of the screw within the thrust rod; and
a rod bearing supporting the thrust rod in the actuator housing and engaging an outer diameter of the thrust rod for radially supporting the thrust rod during axial movement; and
an inner sleeve disposed within the interior of the thrust rod, the inner sleeve engaged by the screw bearing for supporting the screw bearing against radial movement.

2. The linear actuator of claim 1,
wherein an inner surface of the inner sleeve engaged by the screw bearing has a first surface roughness, and
wherein an inner surface of the thrust rod defining the interior has a second surface roughness greater than the first surface roughness.

3. The linear actuator according to claim 1,
wherein an inner surface of the inner sleeve engaged by the screw bearing has a first coefficient of friction, and
wherein an inner surface of the thrust rod defining the interior has a second coefficient of friction greater than the first coefficient of friction.

4. The linear actuator according to claim 1, wherein the inner sleeve is radially inwardly spaced from the thrust rod.

5. The linear actuator according to claim 1, further including an end cap coupling together the nut, the thrust rod, and the inner sleeve.

6. The linear actuator according to claim 1, further including end caps coupled to opposite ends of the inner sleeve and the thrust rod to couple together the inner sleeve and the thrust rod.

7. The linear actuator according to claim 1, wherein the inner sleeve and the thrust rod are disposed concentrically with respect to one another.

8. The linear actuator according to claim 1, wherein the inner sleeve is extruded to provide during extrusion a desired surface finish.

9. The linear actuator according to claim 1, wherein the inner sleeve is made of aluminum.

10. A linear actuator, comprising:
an actuator housing;
a tubular thrust rod with an interior;
a rod bearing in the housing engaging the thrust rod for supporting the thrust rod against radial movement;
a drive screw assembly including a rotatable drive screw extending into the thrust rod for driving axial movement of the thrust rod relative to the actuator housing;
a coupler disposed at a proximal end of the thrust rod, the coupler coupling the thrust rod to the screw for supporting translation of rotational movement of the screw into axial movement of the thrust rod; and
an inner sleeve disposed at least partially in the interior of the thrust rod, the inner sleeve supporting the screw against radial movement during axial movement of the thrust rod.

11. The linear actuator according to claim 10,
wherein an inner surface of the inner sleeve supporting the screw against radial movement has a first surface roughness, and
wherein an inner surface of the thrust rod defining the interior has a second surface roughness greater than the first surface roughness.

12. The linear actuator according to claim 10,
wherein an inner surface of the inner sleeve supporting the screw against radial movement has a first coefficient of friction, and wherein an inner surface of the thrust rod defining the interior has a second coefficient of friction greater than the first coefficient of friction.

13. The linear actuator according to claim 10, wherein the coupler engages the actuator housing for supporting the thrust rod against rotational movement.

14. The linear actuator according to claim 10, wherein the drive screw assembly further includes a nut in threaded engagement with the screw and coupling the end cap to the screw.

15. The linear actuator according to claim 10, wherein the inner sleeve is coupled to the thrust rod by the coupler.

16. The linear actuator according to claim 10, wherein the drive screw assembly further includes a screw bearing rotatably journaled to a distal end of the screw and engaging the inner sleeve.

17. The linear actuator according to claim 10, wherein the inner sleeve and the thrust rod are disposed concentrically with respect to one another.

18. The linear actuator according to claim 10, wherein the inner sleeve is extruded to provide during extrusion a desired surface finish.

19. The linear actuator according to claim 10, wherein the inner sleeve is made of aluminum.

20. A method of manufacturing a linear actuator, comprising:
    coupling a rotatable drive screw within an actuator housing;
    inserting a tubular thrust rod having an interior into the actuator housing, wherein the thrust rod is radially outwardly spaced from the screw;
    threading a translatable nut to the screw for translating the nut along a longitudinal axis of the actuator housing relative to movement of the screw;
    coupling the nut to the thrust rod for translating rotational movement of the screw into axial movement of the thrust rod relative to the actuator housing;
    inserting a thrust rod bearing in the housing for engaging an outer diameter of the thrust rod for radially supporting the thrust rod during axial movement of the thrust rod;
    rotatably journaling a screw bearing to a distal end of the screw;
    inserting an inner sleeve within the interior of the thrust rod; and
    slidably engaging the screw bearing with inner sleeve for supporting the screw against radial movement during axial movement of the thrust rod.

21. The method according to claim 20, further including preparing an inner surface of the inner sleeve for engaging the screw bearing to have a first surface roughness lesser than a second surface roughness of an inner surface of the thrust rod defining the interior.

22. The method according to any claim 20, further including preparing an inner surface of the inner sleeve for engaging the screw bearing to have a first coefficient of friction lesser than a second coefficient of friction of an inner surface of the thrust rod defining the interior.

23. The method according to claim 20, further including radially inwardly spacing the inner sleeve from the thrust rod.

24. The method according to claim 20, wherein coupling an inner sleeve within the interior of the thrust rod includes coupling an end cap to respective ends of the inner sleeve and the thrust rod.

25. The method according to claim 20, further including coupling an end cap to a proximal end of the thrust rod and engaging the end cap with the actuator housing for supporting the thrust rod against rotational movement during axial movement of the thrust rod.

26. The method according to claim 20, further including extruding the inner sleeve to provide during extrusion a desired surface finish.

27. A method of extending a linear actuator, comprising:
    driving a rotatable drive screw coupled to and disposed within an actuator housing;
    driving axial movement of a tubular thrust rod having an interior via the screw, the axial movement being relative to the actuator housing;
    supporting the thrust rod about its outer diameter with a rod bearing disposed within the actuator housing, the rod bearing supporting the thrust rod against radial movement during axial movement of the thrust rod; and
    supporting the screw against radial movement via engagement of a screw bearing coupled to a distal end of the screw with an inner sleeve coupled within the interior of the thrust rod.

28. The method according to claim 27, wherein driving axial movement of the thrust rod includes driving a nut threadedly engaged with the screw and coupled to the thrust rod for movement with the nut, the nut being driven relative to the screw.

29. The method according to claim 27, further including translating rotational movement of the screw into axial movement of the thrust rod via a nut threadedly engaged with the screw and coupled to the thrust rod for movement with the nut.

30. The method according to claim 27, wherein supporting the screw against radial movement includes engagement of the screw bearing with an inner surface of the inner sleeve, the inner sleeve having a first surface roughness, the first surface roughness being lesser than a second surface roughness of an inner surface of the thrust rod defining the interior.

31. The method according to claim 27, wherein supporting the screw against radial movement includes engagement of the screw bearing with an inner surface of the inner sleeve, the inner sleeve having a first coefficient of friction, the first coefficient of friction being lesser than a second coefficient of friction of an inner surface of the thrust rod defining the interior.

* * * * *